United States Patent
Chen et al.

(10) Patent No.: US 6,697,809 B2
(45) Date of Patent: Feb. 24, 2004

(54) DATA RETRIEVAL AND TRANSMISSION SYSTEM

(75) Inventors: Bing-Shing Chen, Fremont, CA (US); Peiwei Mi, Cupertino, CA (US); Subhash B. Tantry, Palo Alto, CA (US); Naga Widjaja, Sunnyvale, CA (US)

(73) Assignee: Vigilance, Inc., Sunnyvale, CA (US)

( * ) Notice: Subject to any disclaimer, the term of this patent is extended or adjusted under 35 U.S.C. 154(b) by 130 days.

(21) Appl. No.: 09/886,393

(22) Filed: Jun. 20, 2001

(65) Prior Publication Data

US 2002/0156761 A1 Oct. 24, 2002

Related U.S. Application Data

(60) Provisional application No. 60/299,669, filed on Jun. 19, 2001, provisional application No. 60/296,948, filed on Jun. 8, 2001, and provisional application No. 60/285,647, filed on Apr. 19, 2001.

(51) Int. Cl.[7] ............................................. G06F 17/00
(52) U.S. Cl. .......................... 707/10; 707/101; 707/102
(58) Field of Search ..................................... 707/1–206

(56) References Cited

U.S. PATENT DOCUMENTS

| | | | |
|---|---|---|---|
| 5,630,123 A | 5/1997 | Hogge ......................... 395/607 |
| 5,734,645 A | 3/1998 | Raith et al. | |
| 5,748,104 A | 5/1998 | Argyroudis et al. | |
| 5,794,210 A | 8/1998 | Goldhaber | |
| 5,812,668 A | 9/1998 | Weber ......................... 380/24 |
| 5,845,258 A | 12/1998 | Kennedy ....................... 705/8 |
| 5,855,008 A | 12/1998 | Goldhaber et al. | |
| 5,917,405 A | 6/1999 | Joao | |
| 5,931,900 A | 8/1999 | Notani et al. ................ 709/201 |
| 6,055,519 A | 4/2000 | Kennedy ............... 705/80 |
| 6,157,915 A | 12/2000 | Bhaskaran et al. ............. 705/7 |
| 6,185,613 B1 | 2/2001 | Lawson et al. | |
| 6,211,782 B1 | 4/2001 | Sandelman et al. | |
| 6,405,212 B1 * | 6/2002 | Samu et al. .................... 707/9 |
| 6,446,089 B1 * | 9/2002 | Brodersen et al. .......... 707/101 |
| 6,560,776 B1 * | 5/2003 | Breggin et al. ............. 707/203 |

OTHER PUBLICATIONS

Baker et al., A priority6 event monitor for an interrupt–driven microprocessor, Southeastcon '91, IEEE Proceedings of, Apr. 7–10, 1991.*

Nikolov et al., A portable multiprocessing nucleus for real–time applications, Software Engineering for Real Time Systems, 1989, Second International Conference on, Sep. 18–20, 1989, pp. 237–241.*

May, The performance assessment of sonar data highways using dynamic modelling techniques, Simulation Techniques Applied to Sonar, IEE Colloquium on, May 19, 1988, pp. 12/1–12/3.*

Loesser, Keeping Web Pages Up–To–Date With SQL: 1999, In. Database Engineering and Applications Symposium (IDEAS 2000), Yokohama, Japan, Sep. 2000.*

\* cited by examiner

*Primary Examiner*—David Jung
(74) *Attorney, Agent, or Firm*—Beyer Weaver & Thomas LLP

(57) ABSTRACT

Methods and apparatus are disclosed for modifying data for use by a business. Data including one or more values are obtained. At least a portion of the data is then flagged to identify one or more business events of interest to the business. The flagged data for one or more of the identified business events is then provided, thereby enabling the identified business events to be monitored.

92 Claims, 10 Drawing Sheets

```
Customer ID              ← Business attribute #1  ─ 204  ⎫
Order #                  ← Business attribute #2  ─ 206  ⎬ 202
Ship date ─ 214                                          ⎭
SKU1
Number of orders for SKU1
Inventory level for SKU1 ← Business metric #1     ─ 210  ⎫
SKU2                                                     ⎬ 208
Number of orders for SKU2
Inventory level for SKU2 ← Business metric #2     ─ 212  ⎭
 .
 .
 .
```

| Attribute name | Data type | Attribute value | Attribute # | Metric value flag |
|---|---|---|---|---|
| Customer | String | "SHOES_INC" | 1 | |
| Order No. | Integer | 42859 | 2 | |
| Ship date | String | "01/04/01" | | |
| SKU1 | Integer | 000195 | | |
| Number of orders – SKU1 | Integer | 4 | | |
| Inventory level for SKU1 | Integer | 97 | | 1 |
| SKU2 | Integer | 000228 | | |
| Number of orders – SKU2 | Integer | 16 | | |
| Inventory level for SKU2 | Integer | 31 | | 2 |

|   1502    |   1504     |
|-----------|------------|
| Hash key  | Hash value |
| Key 1     | String 1   |
| Key 2     | String 2   |

1602  Mapping Table  1604

| Hash key | Original record position (e.g., pointer) |
|----------|------------------------------------------|
|          |                                          |

DATA RETRIEVAL AND TRANSMISSION SYSTEM

CROSS-REFERENCE TO RELATED APPLICATIONS

This application claims priority of U.S. Provisional Application No. 60/285,647, entitled "BUSINESS EVENT MONITORING AND DETECTION SYSTEM," filed on Apr. 19, 2001, which is hereby incorporated by reference for all purposes.

This application also claims priority of U.S. Provisional Application No. 60/296,948, entitled "EVENT MONITORING, DETECTION AND NOTIFICATION SYSTEM HAVING SECURITY AND COLLABORATIVE FUNCTIONS," filed on Jun. 8, 2001, which is hereby incorporated by reference for all purposes.

This application also claims priority of U.S. Provisional Application No. 60/299,669, entitled "COLLABORATIVE RESOLUTION AND TRACKING OF DETECTED EVENTS AND CONDITIONS," filed on Jun. 19, 2001, which is hereby incorporated by reference for all purposes.

This invention is also related to U.S. patent application Ser. No. 09/886,397, filed on the same day as this patent application, naming K. Tu et al. as inventors, and entitled "EVENT MONITORING AND DETECTION SYSTEM." That application is incorporated herein by reference in its entirety and for all purposes.

This invention is also related to U.S. patent application Ser. No. 09/886,408, filed on the same day as this patent application, naming K. Tu et al. as inventors, and entitled "EVENT NOTIFICATION SYSTEM." That application is incorporated herein by reference in its entirety and for all purposes.

This invention is also related to U.S. patent application Ser. No. 09/886,402, filed on the same day as this patent application, naming N. Kumar et al. as inventors, and entitled "SECURITY SYSTEM FOR EVENT MONITORING, DETECTION AND NOTIFICATION SYSTEM." That application is incorporated herein by reference in its entirety and for all purposes.

This invention is also related to U.S. patent application Ser. No. 09/886,403, filed on the same day as this patent application, naming P. Mi et al. as inventors, and entitled "EVENT MONITORING, DETECTION AND NOTIFICATION SYSTEM." That application is incorporated herein by reference in its entirety and for all purposes.

BACKGROUND OF THE INVENTION

1. Field of the Invention

The present invention relates to a data retrieval and transmission system. More particularly, the present invention relates to data retrieval and transmission in accordance with defined business events.

2. Description of the Related Art

Modern business enterprises rely heavily on a wide variety of information technology, including both software and hardware, to implement business strategies, to allocate resources, to track the execution of business processes, and to provide an interface for communication with customers, vendors and their own personnel. These systems will hereinafter be referred to as "enterprise systems." Business processes executed by a business enterprise may be executed across enterprise system boundaries as well as within enterprise system boundaries.

Even during standard, non-peak operating conditions, the quantity of data that is transmitted by an enterprise system can be enormous. This data may be received by a business enterprise or produced by a business enterprise for internal use as well as for transmission outside the business enterprise system. However, regardless of the quantity of the data that is produced or transmitted, the quality of that data can vary greatly in content and importance. This variance can occur for a variety of reasons. For example, the data that is transferred among various entities within a business enterprise boundary or outside the business enterprise boundary may vary with the needs of those entities receiving or requesting the data. With the vast amount of data transmitted in enterprise systems and the varying content and importance of this data, detection of problems solely from that data is a complicated task. As a result, existing and potential problems that could arise during the execution of business processes dependent upon that data could go undetected. It would therefore be desirable if the content and importance of the data to the business enterprise producing and/or receiving the data could be indicated in the data transmitted by the enterprise system. Moreover, it would be beneficial if a mechanism for monitoring and detecting conditions based upon the transmitted data could be established.

Existing enterprise systems enable business enterprises to coordinate their internal and external activities in a variety of ways, including data transfer, analysis and processing. More particularly, such enterprise systems produce a flow of data that is used by business enterprises for tasks as diverse as the implementation of strategies for internal use such as accounting and the allocation of resources, and strategies for use across enterprise system boundaries such as order processing systems. Once received by the appropriate business or entity, the data is often parsed or analyzed for the information that is pertinent to the desired function to be performed by that entity. Unfortunately, this parsing and analysis is a time-consuming one, often requiring additional personnel to perform data collection and analysis.

One example of the data processing typically performed by many businesses is the processing of orders. Many businesses that supply products to consumers or retailers use order-processing systems to receive and process data associated with incoming orders. However, such order processing systems have limitations. As a result, additional software is often purchased or additional personnel may be hired to monitor its inventory to ensure that it can satisfy its incoming orders. Similarly, in order to monitor the timeliness of the processing of incoming orders, additional software products or personnel may be required to ensure that the ship dates fall within the expected or promised ship dates. Thus, additional resources are often required to ensure that ordered products are shipped in a timely manner, as well as to detect when products have not or cannot be shipped in a timely manner. As a result, business expenses that may be incurred to support such data analysis are not insubstantial. It would therefore be desirable if such additional resources typically required for analysis of data could be reduced or eliminated.

One method commonly used by businesses to track the data that is pertinent to their business is through the generation of reports. For instance, reports commonly generated often involve the use of spreadsheets. Although such report generation is a simple tool that may be easily adapted for all businesses, once the reports are generated, personnel hired by the business must manually review the data. As one example, the data within a single report may be correlated with other data in the same report. As another example, data within one report may need to be correlated with another report or multiple reports. Such manual interpretation of data is time consuming and requires numerous man-hours, increasing the business expenses required to successively operate a business. Moreover, such manual interpretation is at risk of misinterpretation due to the likelihood of human error. Accordingly, it would be preferable if the retrieval and monitoring of data could be automated.

Another problem with the generation of reports is that such reports merely reformat data for simplified viewing and data comparison. Moreover, since such report generation solely accomplishes the reformatting of data, those reports cannot be used for purposes of subsequent monitoring of that data. In other words, a report is a snapshot of data at a single point in time. More particularly, data values that are imported for purposes of a report will be values that are important to that business. However, data values change over time, and a single report cannot reflect such value changes. Thus, the mere generation of a report cannot be used for subsequent monitoring of that data as it changes over time. Even if multiple reports were generated, this does not enable or simplify the monitoring of the data illustrated in the generated reports. It would therefore be desirable if a mechanism were designed to enable the automated monitoring of valuable business data. Moreover, it would be beneficial if such a system could be customized for use by any business or industry.

In view of the above, it would be desirable if a business enterprise could attach a business context to data being transmitted by a business enterprise system to indicate the content and/or importance of the data. In addition, it would be beneficial if data transmitted by a business enterprise system could be monitored to detect various events deemed important to the business enterprise transmitting the data, such as an entity (e.g., department or group) within the business enterprise. Similarly, it would be desirable if the data transmitted by the business enterprise system could be monitored to detect various events deemed important to an entity (e.g., customer) external to the business enterprise system that is expecting to receive the data, products, services, or other information.

SUMMARY OF THE INVENTION

The present invention provides an adapter that enables data to be gathered and modified to identify various business events of interest to a business. Through the modification of data in a manner suitable to the business, these business events may be monitored to enable various conditions to be detected. In this manner, notification of such conditions may be provided to the appropriate entities. Through such notifications, valuable business decisions may be made to ensure successful business operations. In addition, it is important to note that although the exemplary figures and description refer to the use of the present invention in a business context, the present invention is equally applicable to the modification of data for identification of events in other contexts as well.

In accordance with one aspect of the invention, data is obtained and modified for use by a business. First, data including one or more values are obtained. Next, at least a portion of the data is flagged to identify one or more business events of interest to the business. The flagged data for one or more of the identified business events of interest to the business is then provided to one or more entities, thereby enabling the identified business events to be monitored. For instance, the flagged data may be transmitted on a message bus to be retrieved by an agent configured for monitoring the existence of conditions with respect to various business events.

In accordance with another aspect of the invention, the data is flagged to supply a business context to the data. This may be accomplished through the flagging of one or more business attributes that together define a particular business event. Moreover, one or more business metrics may be flagged to identify one or more values that are to be monitored in association with the business event.

In accordance with yet another aspect of the invention, preferences are established to configure the system for a particular business or industry. As one example, retrieval preferences indicating the manner and content of data to be retrieved are obtained. For instance, the retrieval preferences may indicate one or more sources of data, the data (e.g., fields) to be retrieved, and the frequency with which data is to be retrieved. As another example, sending preferences may be obtained that indicate the manner in which the data (e.g., fields) are to be flagged. For instance, the data may be flagged to indicate those fields that are to be monitored or used in subsequent value comparisons. Accordingly, the present invention may be customized for any business or industry.

The present invention enables data to be given meaning within a particular business context. Through the identification of business events, these business events may be monitored in an automated manner. Accordingly, in response to the detection of various business events, states, or conditions, a suitable notification may be provided to the appropriate entities.

These and other features of the present invention will be described in more detail below in the detailed description of the invention and in conjunction with the following figures.

DETAILED DESCRIPTION OF THE INVENTION

In the following description, numerous specific details are set forth in order to provide a thorough understanding of the present invention. It will be obvious, however, to one skilled in the art, that the present invention may be practiced without some or all of these specific details. In other instances, well known process steps have not been described in detail in order not to unnecessarily obscure the present invention.

The present invention enables data to be given meaning within a particular business context. More particularly, the data is flagged (e.g., labeled, marked, or indexed) to identify one or more business events of interest to the business. The resulting data may then be provided for access by various entities adapted for monitoring these business events. In this manner, notification of various business events and states of these business events may be transmitted.

Figure 1:
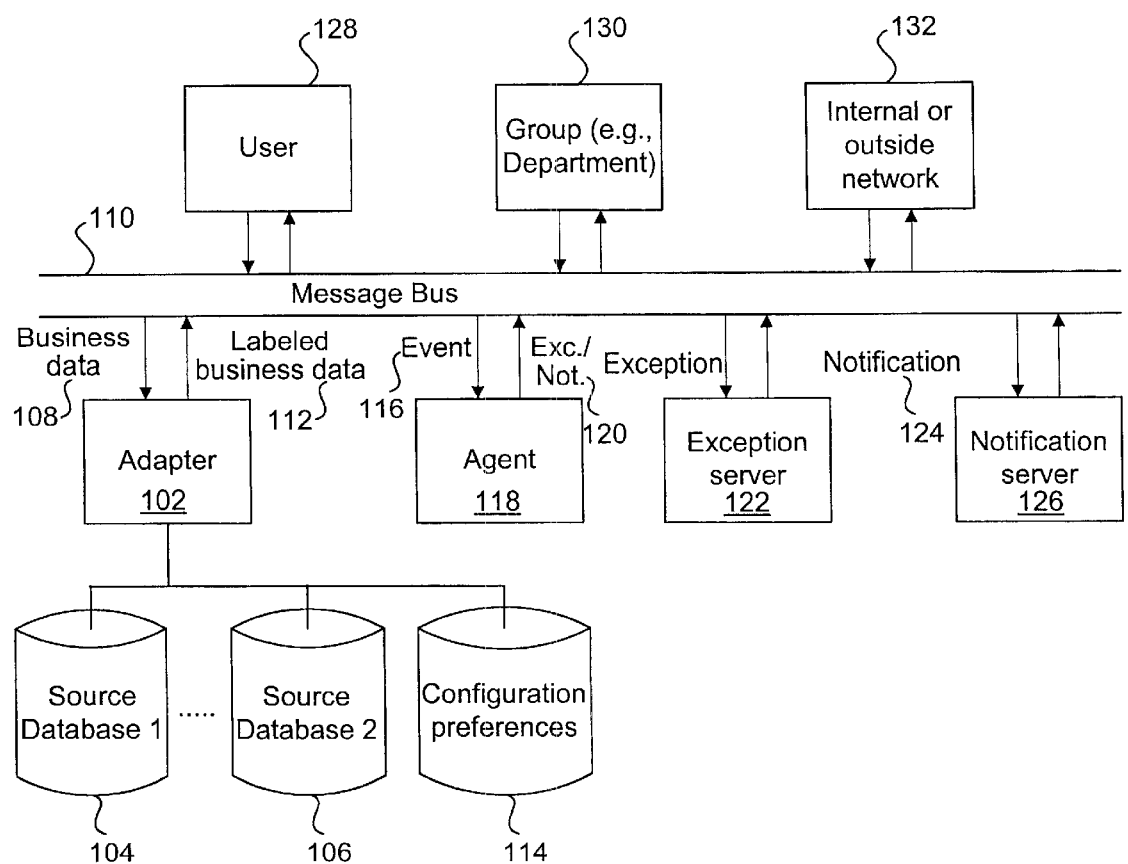
FIG. 1 is a block diagram illustrating one embodiment of the invention.

FIG. 1 is a system diagram illustrating one embodiment of the invention that may be implemented on a business site. As shown, an adapter 102 is provided for modifying data for use by a business. The term "business" will hereinafter be used to refer to any association, organization, company, corporation, or industry. Thus, the business need not be operated for profit. In the following exemplary figures, data that is retrieved is modified and transmitted for use by a business that processes orders. However, these figures are merely illustrative and therefore the present invention may be used for a variety of purposes and by a variety of businesses.

As shown in FIG. 1, the adapter 102 can obtain data from a variety of sources. For instance, as shown, the adapter 102 may retrieve data from one or more databases 104, 106. These databases 104, 106 may support a variety of protocols and therefore need not support the same protocol or database vendors. As a result, data may be acquired from a variety of sources and for a variety of purposes. As one example, the data may include data obtained from a source external to the business, such as customer data obtained at least in part from one or more customers. As another example, the data may be data generated internally such as the data stored for accounting purposes. In addition, the adapter 102 may obtain data 108 from a message bus 110. The adapter 102 operates in real-time or on a schedule to obtain data as well as modify the data received and/or obtained by the adapter 102. Although the adapter 102 may be connected directly to various components that enable event detection and notification, a message bus is preferred, since this facilitates and simplifies the addition and removal of components. In addition, since the message bus 110 connects other entities within or associated with the business such as users of a business enterprise system (e.g., business employees) to the event detection and notification system, the adapter 102 may obtain data provided by these entities via the message bus 110. It is also contemplated that the data may be obtained or received from a source outside the business, such as via the Internet.

Once data is obtained by the adapter 102, at least a portion of the data is flagged (e.g., labeled, marked or indexed) to identify one or more business events of interest to the business. In this manner, the data is given meaning within a particular business context. An exemplary diagram illustrating data that is flagged to identify business events of interest to a business will be shown and described in further detail below with reference to FIG. 2. The flagged data is then provided by the adapter 102 for access by other components. More particularly, the flagged data may be transmitted via the message bus 110. For instance, as described above, other components that enable detection and notification of various events or states of events may access the modified data via the message bus 110. In this manner, the business events identified by the modified data may be monitored and detected.

The content of the data and the manner in which the data is obtained by the adapter 102 may be configured as preferences 114. More particularly, configuration preferences may be stored in one or more databases as shown. In addition, although such preferences 114 may be coupled to the message bus 110, the preferences 114 may also be coupled to one or more modules or servers (e.g., adapter), as shown. In addition, although not illustrated, other modules such as the agent may also have configuration preferences, which may be stored in one or more databases, separately or in combination with the preferences 114. One method of configuring such retrieval preferences will be described in further detail below with reference to FIG. 5. Similarly, the preferences 114 may also indicate the content of the modified data to be transmitted, the events that are to be identified by the modified data, and the manner in which the modified data is to be transmitted. One method of configuring such sending preferences will be described in further detail below with reference to FIG. 6. The retrieval preferences and sending preferences may indicate preferences of the business as a whole, preferences of a particular entity within the business, or even preferences of a particular entity outside the business, such as a customer of the business. As one example, the shipping department of a business may indicate a first set of preferences so that inventory levels and ship dates can be monitored, while the accounting department of a business may indicate a second set of preferences to enable staffing and other resources to be tracked. As another example, a customer may request that a third set of preferences be established to ensure that its orders are shipped within three days of receipt. Thus, through the configuration of preferences 114, the content and manner in which data is retrieved and modified to identify various business events may be customized for a particular business or industry.

The modified data identifying one or more business events 116 are then obtained or intercepted by an agent 118. For instance, data that is published by an adapter 102 on a message bus such as the message bus 110 may be received by one or more agents 118 listening for events or specific events. Thus, the modified data is preferably sent in a format that is understandable by the agent 118. The agent 118 is adapted for detecting the events or monitoring the events such that an exception 120 (or notification) is generated when appropriate. More particularly, the agent 118 may monitor the events to detect various conditions as well as specific events. When one or more conditions are satisfied, the agent 118 may either wish to send a notification of the condition with respect to the event or generate an exception. A notification is sent merely to notify the recipient of the satisfaction of one or more conditions or states of specified business events. However, in addition to this information, an exception further enables the collaboration necessary to act on those events by multiple entities. In addition, an exception preferably enables the tracking and resolution of the exception. For instance, the exception may indicate one or more entities that are to be assigned the exception. In other words, one or more entities are given the responsibility to resolve the exception, while a notification may merely serve to notify an individual of the exception. In this manner, multiple entities may collaborate to resolve an issue. These entities may be individuals or groups of individuals, such as a department within a business. In summary, exception(s) 120 or notification(s) generated by the agent 118 may indicate a variety of circumstances requiring further action or attention by another component in the system. Similarly, the exception(s) 120 or notification(s) generated by the agent 118 may indicate circumstances requiring human intervention.

In one embodiment, the exception(s) 120 are intercepted by an exception server 122 that is adapted for generating an appropriate notification 124 of the event or state of the event. In addition, the exception server 122 enables collaboration between the entities that are assigned various exceptions. For instance, this may be accomplished through various graphical user interfaces that enable communication between the entities.

While notifications could be sent directly to the addressees, a notification server 126 may be used to provide mechanisms for managing notification messages and determining the manner and time that each notification message is to be sent. Thus, in this example, the notification 124 is received or obtained by a notification server 126 adapted for transmitting notification messages. As described above, the notification 124 that is received by the notification server 126 may be sent from the agent 118 or the exception server 122, as described above. The notification server 126 then sends a suitable notification message to one or more addressees, such as user 128 or group 130 (e.g., department). Such messages may also be transmitted to the entire network 132, which may be an internal network or may include a network external to the business, such as the Internet. The notification 124 may include a variety of information associated with the business event. In addition, the notification may be sent to one or more specified addressees in accordance with specified delivery parameters. More particularly, the delivery parameters may indicate the mode of delivery (e.g., email, facsimile, pager) as well as a time or time window for delivery.

The following example serves to illustrate the interaction of the adapter 102, the agent 118, the exception server 122, and the notification server 126. For example, consider the situation of a fire in a plant. In accordance with one embodiment, the adapter 102 captures data from an alarm system, which indicates the existence of the fire and possibly the building and/or specific location of the fire. The adapter 102 then publishes this event (e.g., "fire in Plant A"). An agent 118 that is watching for the publication of that event for Plant A detects the event when it occurs and publishes an occurrence of an exception. The exception server 122 subscribes to the exception event, logs it and further invokes the notification server 126 to notify the appropriate users 128 that the exception has occurred.

Figures 2, 3:
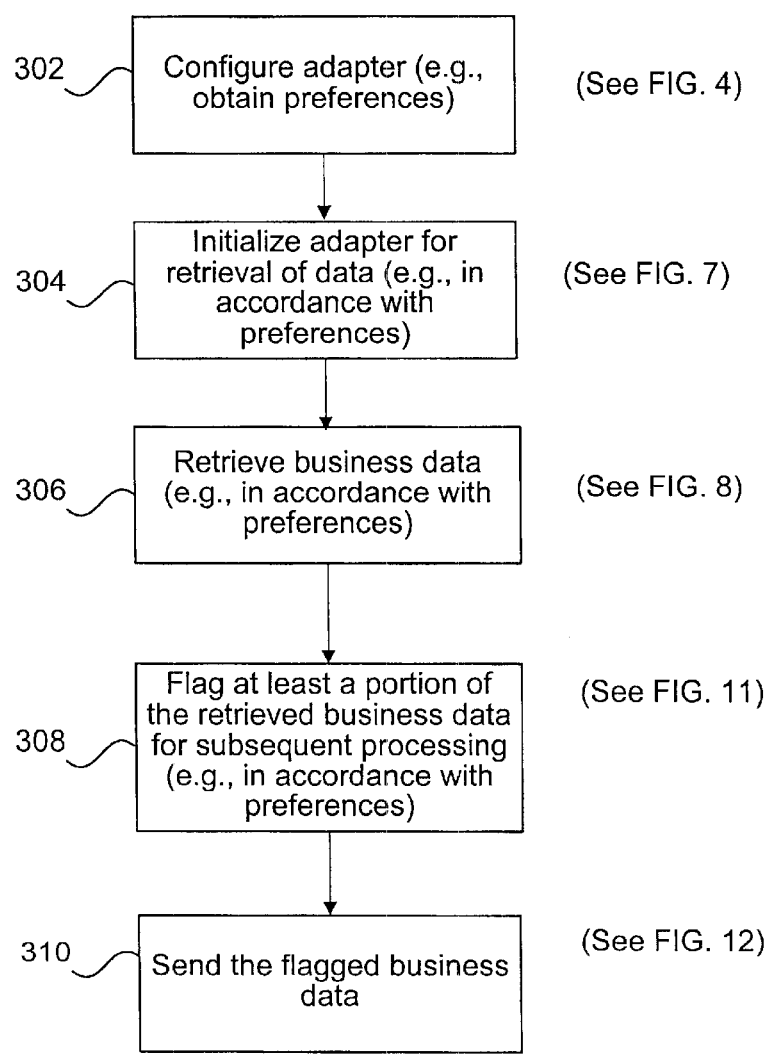
FIG. 2 is a diagram illustrating exemplary data that is retrieved and flagged in accordance with one embodiment of the invention.
FIG. 3 is a process flow diagram illustrating one method of providing flagged data for business event detection and monitoring in accordance with an embodiment of the invention.

Each business event is identified through the flagging (e.g., marking) of at least a portion of the retrieved data. FIG. 2 is a diagram illustrating exemplary data that is retrieved and flagged in accordance with one embodiment of the invention. In this example, the data that is retrieved has been flagged for use by a business that receives and processes orders. As shown, the data that is retrieved can include one or more values associated with one or more fields, which may vary with the business and purpose for which the data is used. For example, the values may be string, integer, floating point, or other value types. In this example, information for a customer order is provided. A business event may be any circumstance that a business deems important enough to require monitoring or detection. For instance, in this example, a business event may simply indicate that an order has been received or that various values require monitoring or further comparison. The data may be flagged such that a business event is identified by content of the data, importance of the data, and/or purpose of at least a portion of the data. More particularly, the content of the data may be identified by one or more business attributes 202. In this example, the business attributes 202 together indicate that the content of the data is a customer order. As shown, each business attribute 204, 206 may separately identify data that is important to the identified business event (e.g., customer order). In addition, the purpose of the data may be indicated by one or more business metrics 208 of interest to the business for which one or more values are to be monitored. In other words, through the business metrics, it is indicated that the purpose of at least this portion of the data is for monitoring of the associated business event. Thus, business metrics 208 may be considered to be a subset of business attributes. As shown, each business metric 210, 212 may separately identify data values such as inventory levels that are to be monitored or compared to another set of values. Although not flagged as a business attribute or business metric in this particular example, the ship date 214 of the particular order may be flagged to indicate that the ship date is to be monitored. This may be desirable, for instance, if an order is to be shipped within a particular date of receipt of the order. Accordingly, through flagging data, one or more values or fields may be labeled as values or fields of interest to one or more entities of the business. In this manner, each business event is defined for future monitoring, detection, and notification by the business.

Each business attribute and business metric may be identified in a variety of ways. For example, pointers, linked lists, arrays, or indices may be used to identify and track the attributes and metrics. In addition, labels that are more descriptive than data structures such as indices or arrays may be used to further define the event. Thus, these labels may serve as event descriptors for the flagged data. Moreover, these data structures may also be used to indicate the importance of the data that is flagged. For instance, the flagged data may be restructured or re-ordered to reflect the order of importance of the flagged data through the use of one or more indices that enable the flagged data to be ranked according to importance. More particularly, one index may be used to identify and prioritize business attributes while another index may be used to track and prioritize business metrics. However, in this example, the business attributes (identifying a customer order) and business metrics (identifying inventory levels) need not be prioritized. In this manner, another module or human receiving this flagged data may perform monitoring, detection, and notification functions based upon selected portions of the flagged data or perform these functions based upon the order of importance provided in the flagged data.

The flagging that is performed to identify a business event may also include the modification of the data in the form of restructuring the original data and/or the inclusion of additional data. As one example, the data may be re-ordered or restructured in a data structure such as an array such that the first N elements define the event. As another example, the flagging process may also include additional data as well as or instead of the association of business attributes and/or business metrics with the original data.

An adapter such as that illustrated at block 102 of FIG. 1 may be implemented in a variety of ways. FIG. 3 is a diagram illustrating one method of implementing an adapter capable of providing flagged data for business event detection and monitoring in accordance with an embodiment of the invention. In one embodiment, the invention is implemented in an object-oriented architecture and therefore multiple adapter instances may be simultaneously functioning to identify and define business events in accordance with predefined preferences. In other words, each adapter instance may have a different set of associated preferences, and therefore function to identify and define different types of business events. However, the adapter need not be implemented in an object-oriented architecture, and therefore this example is merely illustrative. The adapter may be designed specifically for use with a particular business or industry through providing predefined preferences that are not modifiable. However, the adapter is preferably designed such that it is generic for use with any type of business and for any purpose. Since the adapter is customizable for any business or industry, the adapter is first configured as shown at block 302 for the particular business or industry for which it is to be used. More particularly, the adapter may be configured with retrieval preferences indicating the content of the data and the manner in which the data is to be retrieved. For example, the retrieval preferences may indicate one or more sources of data to be retrieved, the frequency with which data is to be retrieved, and the type of data to be retrieved. Similarly, the adapter may be configured with sending preferences indicating the manner in which the retrieved data is to be flagged for transmission. For example, the sending preferences may indicate specific events to be identified within the retrieved data as well as specific information to be monitored. One method of configuring the adapter will be described in further detail below with reference to FIGS. 4–6.

Once the adapter is initialized to serve the particular business or industry, the adapter is initialized to operate according to the desired retrieval and sending preferences at block 304. For instance, a particular adapter instance may be initialized with the preferences obtained during configuration. One method of initializing the adapter will be described in further detail below with reference to FIG. 7. The data is then retrieved in accordance with the retrieval preferences at block 306. One method of retrieving data will be described in further detail below with reference to FIG. 8. At least a portion of the data retrieved is then flagged at block 308 in accordance with the sending preferences to identify one or more business events of interest to the business. As described above with reference to FIG. 2, a business event may be identified by a purpose of at least a portion of the data. For instance, through flagging the data, a business event may indicate that further monitoring of the flagged data fields is to be performed. A more detailed diagram illustrating flagged data such as that shown in FIG. 2 will be described in further detail below with reference to FIG. 11. The flagged data is then sent at block 310 (e.g., via a message bus). An exemplary message format that may be sent on a message bus such as that shown at block 110 of FIG. 1 will be described in further detail below with reference to FIG. 12. In this manner, data that is obtained from various sources (e.g., database, web contents, XML, applications, message bus, entity associated with the business) may be made accessible to one or more entities associated with the business.

Various entities may be configured to receive or retrieve flagged data produced by the adapter. One of the entities adapted for retrieving the flagged data is an agent such as that shown at block 118 of FIG. 1. As described above, the agent is adapted for monitoring the flagged data and generating a business exception (or notification) for various business events that are detected. In addition to merely detecting the existence of the event(s), the agent is preferably adapted for detecting one or more specific states of the flagged data. For instance, the agent is preferably adapted for detecting when one or more conditions are satisfied with respect to specific business events (or data associated with those events), as described above with reference to FIG. 1.

Figure 4:
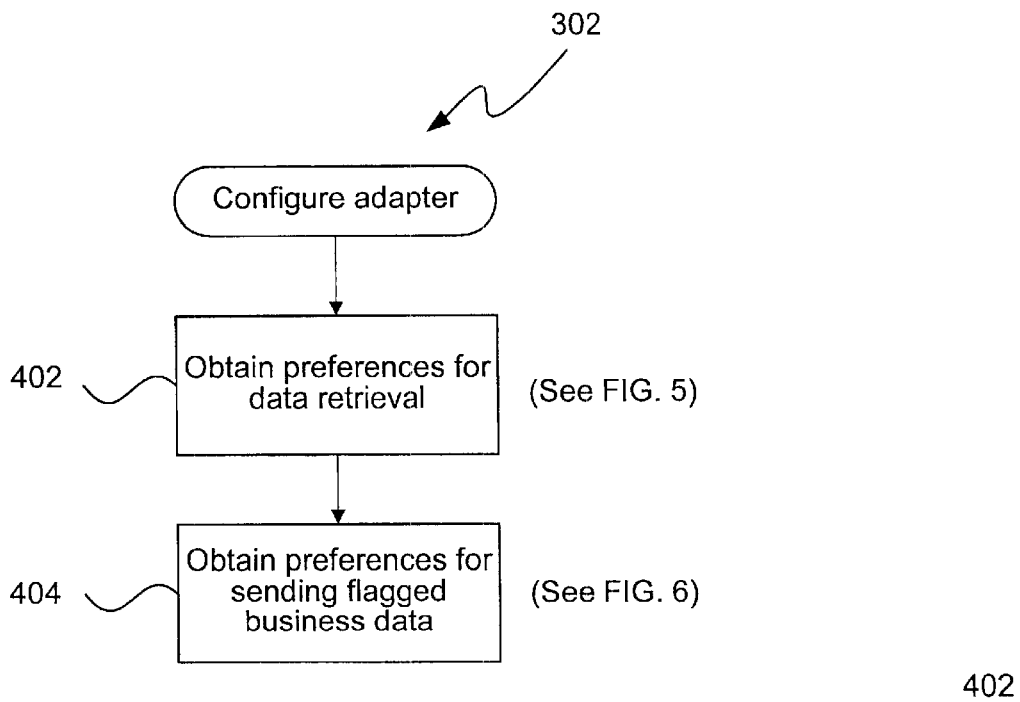
FIG. 4 is a process flow diagram illustrating one method of configuring an adapter as shown at block 302 of FIG. 3.

As described above, the adapter may be configured for the business or industry for which it is to be used. FIG. 4 is a diagram illustrating one method of configuring an adapter as shown at block 302 of FIG. 3. Configuration may include obtaining information including, but not limited to, retrieval preferences and sending preferences. As shown at block 402, retrieval preferences indicating one or more preferences for obtaining data for use by the business are obtained. One method of obtaining retrieval preferences will be described in further detail below with reference to FIG. 5. Similarly, sending preferences indicating one or more preferences for flagging the data to identify one or more business events of interest to the business are obtained at block 404. One method of obtaining sending preferences for marking and transmitting data identifying various business events will be described in further detail below with reference to FIG. 6.

Figure 5:
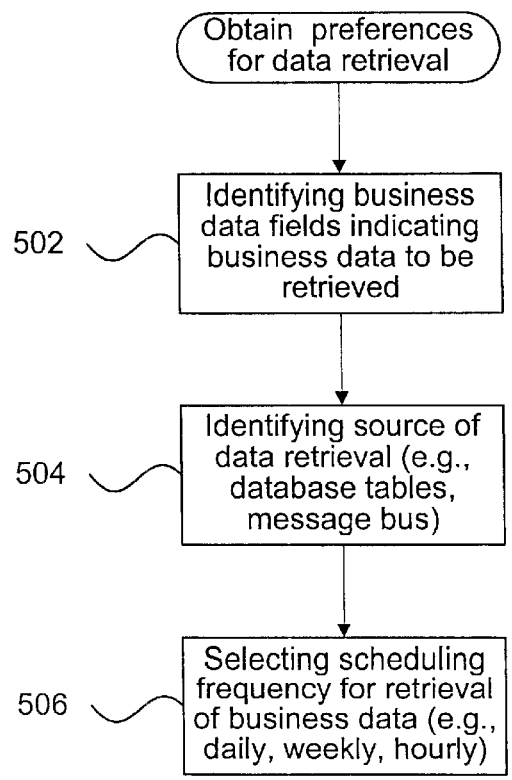
FIG. 5 is a process flow diagram illustrating one method of obtaining preferences for data retrieval as shown at block 402 of FIG. 4.

FIG. 5 is a diagram illustrating one method of obtaining preferences for data retrieval as shown at block 402 of FIG. 4. As described above, the retrieval preferences may indicate business preferences of the business providing the flagged data as well as customer preferences of a customer of the business. For example, the business may record preferences for each of its customers in order to ensure that each customer's needs are met. Thus, the customer preferences may indicate preferences of a business that is to receive at least a portion of the data or a business that is to receive products, services, or information from the business. As shown at block 502, the retrieval preferences may identify data fields indicating data to be retrieved. More particularly, it may be desirable to identify data values that fall within a particular range. For instance, it may be desirable only to monitor inventory levels that fall below customer order expectations. Thus, a data retrieval operator indicating the data to be retrieved for one or more of the indicated data fields may be provided. Various operators such as <, >, <=, >=, =, Like, Not Like, Between, Not Between, Begin With, Not Begin With, End With, Not End With, Contains, Not Contains, One of, and None Of may be used to indicate the data to be retrieved. In addition, one or more sources of data retrieval may be identified as shown at block 504. More particularly, the source of data retrieval may be one or more sources such as one or more message busses and/or one or more databases. In addition, a scheduling frequency for data retrieval may be selected as shown at block 506. For instance, it may be desirable to retrieve data hourly, daily, or weekly from various sources of data. In addition, it may also be desirable to retrieve data that falls within a particular range, such as within working hours (e.g., 9 to 5). Thus, data scheduling operators such as those set forth above may be used to specify the scheduling conditions for data retrieval. The scheduling frequency may be specified for the sources of data as a whole, or specifically for each individual source of data. For instance, it may be desirable to obtain data from the message bus more frequently than data from the databases, or specific databases. In this manner, the data to be retrieved, the source(s) of the data from which the data is to be retrieved, and the frequency with which the specified data is to be retrieved from the source(s) is configured.

Figure 6:
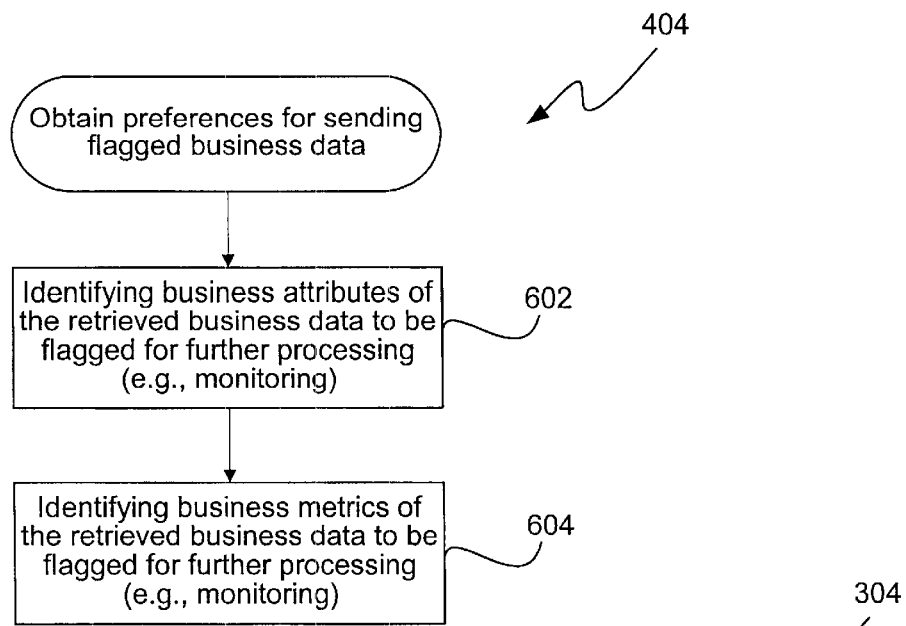
FIG. 6 is a process flow diagram illustrating one method of obtaining preferences for sending flagged data indicating pre-defined business events as shown at block 404 of FIG. 4.

Once the data is retrieved in accordance with the preferences for data retrieval, at least a portion of the data is flagged for transmission, thereby enabling other users or entities within the event detection and notification system to receive or otherwise obtain the flagged data. FIG. 6 is a diagram illustrating one method of obtaining preferences for sending flagged data as shown at block 404 of FIG. 4. As described above with reference to the retrieval preferences, the sending preferences may indicate business preferences of the business providing the flagged data as well as customer preferences of a customer of the business. For example, the business may record preferences for each of its customers in order to ensure that each customer's needs are met. Thus, the customer preferences may indicate preferences of a business that is to receive at least a portion of the data or a business that is to receive products, services, or information from the business. As shown, one or more business attributes of the retrieved data may be identified at block 602 to enable the business attributes to be flagged for further processing or monitoring. As described above, the business attributes together define a business event of interest to the business. In addition, as shown at block 604, one or more business metrics of the retrieved data may be flagged to indicate one or more numerical values to be monitored.

Figure 7:
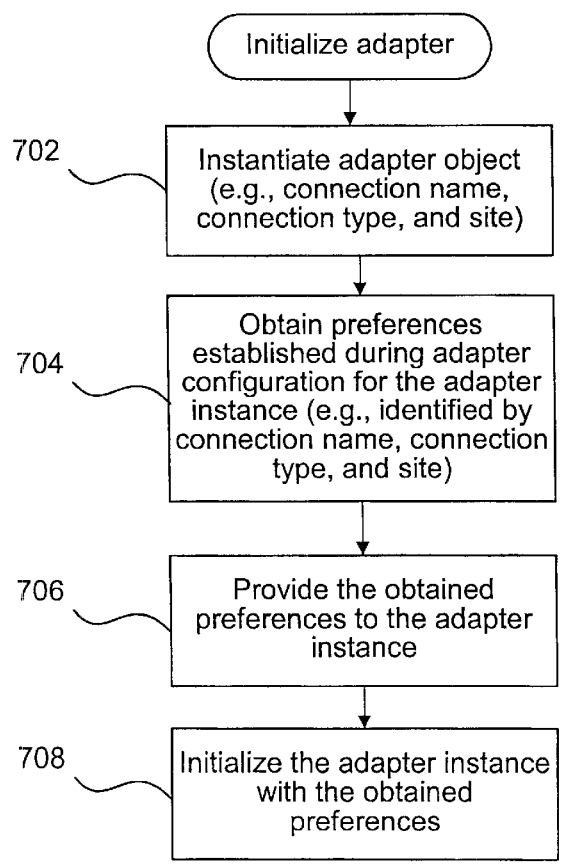
FIG. 7 is a process flow diagram illustrating one method of initializing an adapter as shown at block 304 of FIG. 3.

Once the adapter is configured as shown at block 302 of FIG. 3, the adapter may be initialized with the preferences obtained during configuration. FIG. 7 is a diagram illustrating one method of initializing an adapter as shown at block 304 of FIG. 3. As described above, multiple adapter instances may be instantiated for simultaneous execution. Thus, as shown at block 702, an adapter object is instantiated that preferably includes methods for obtaining data, flagging at least a portion of the data, and providing the flagged data for transmission. For example, an adapter may be instantiated for a particular connection name (e.g., Equipment), connection type (e.g., FabABC), and site (e.g., Company A). The preferences established during adapter configuration are then obtained for the adapter instance at block 704. The preferences obtained at block 704 are then provided to the adapter instance at block 706 to enable the adapter instance to be initialized with the obtained preferences at block 708. In this manner, an adapter instance may be initialized with retrieval preferences and sending preferences such as those described above with reference to FIG. 4 through FIG. 6. As described above, the retrieval preferences indicate the data to be obtained by the adapter object, while the sending preferences indicate data to be flagged and provided by the adapter object.

Figure 8:
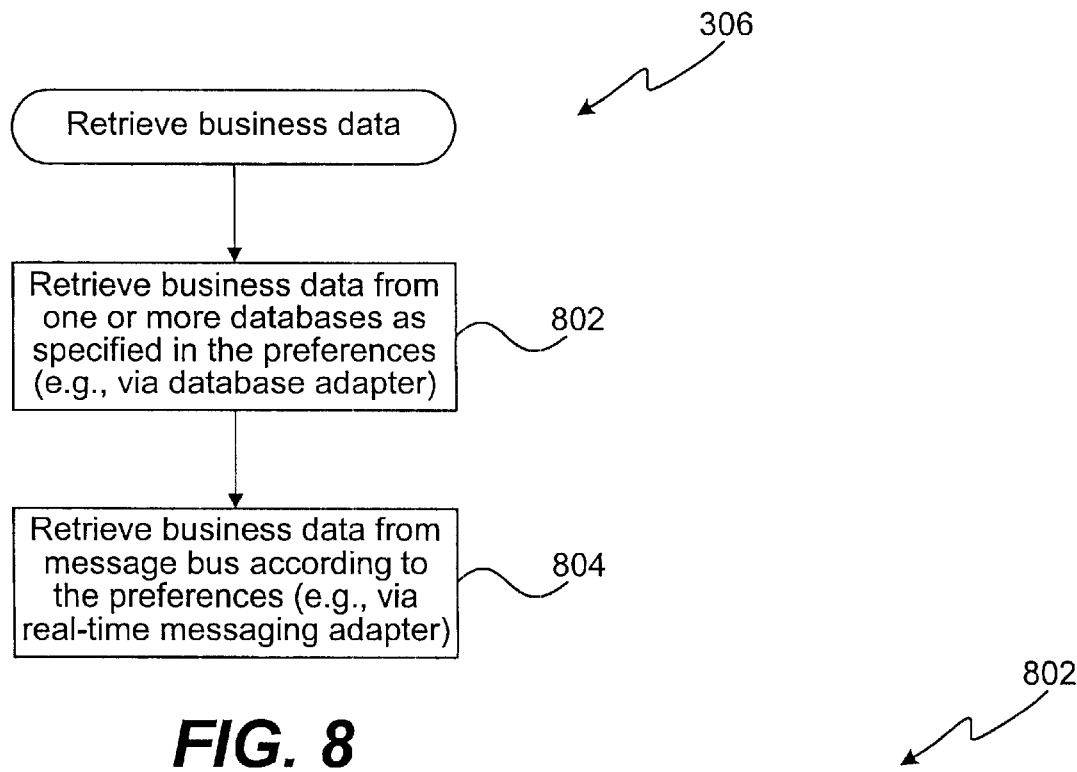
FIG. 8 is a process flow diagram illustrating one method of obtaining data as shown at block 306 of FIG. 3.

As described above with reference to block 306 of FIG. 3, data is retrieved in accordance with preferences obtained during configuration and used to initialize the adapter. FIG. 8 is a process flow diagram illustrating one method of obtaining data as shown at block 306 of FIG. 3. In one embodiment of the invention, two different adapters are used to retrieve data from databases and message buses, respectively. For instance, this may be accomplished through instantiating two different adapter objects. In this manner, two different adapters may be used to conform to different messaging schemes and protocols that may differ between the databases and message bus that are implemented. For instance, a rendezvous message bus available from Tibco Software, located at Palo Alto, Calif. may be used for communication between different system components such as the adapter, agent, exception server, and notification server, while each database may support different protocols. Thus, as shown at block 802, a database adapter retrieves data from one or more databases as specified in the preferences. In addition, a real-time messaging adapter retrieves data from one or more message buses having various message formats in accordance with the preferences as shown at block 804. Thus, through instantiating and initializing two different adapter objects, a database adapter and real-time messaging adapter may be implemented. More particularly, the database adapter object is initialized with the source specifying one or more databases, while the real-time messaging adapter object is initialized with the source specifying one or more message buses with various message formats.

Figure 9:
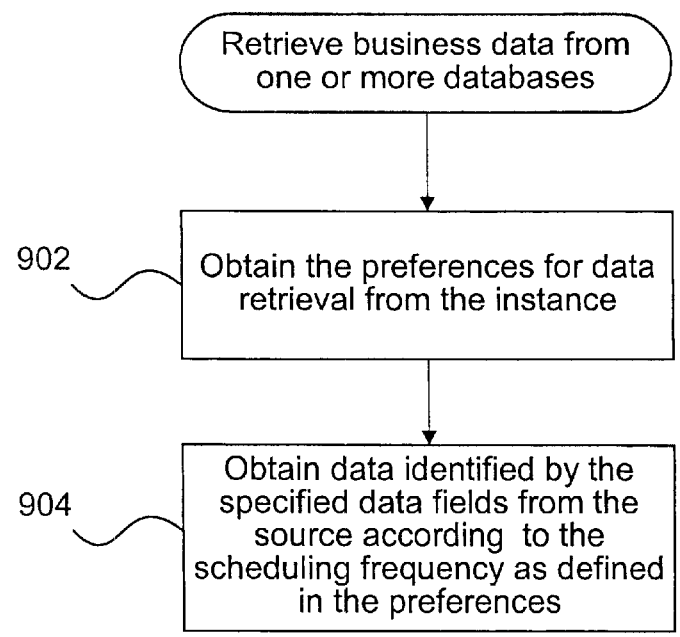
FIG. 9 is a process flow diagram illustrating one method of implementing a database adapter to retrieve data from one or more databases as shown at block 802 of FIG. 8.

The two different adapters are implemented similarly. FIG. 9 is a process flow diagram illustrating one method of implementing a database adapter to retrieve data from one or more databases as shown at block 802 of FIG. 8. First, the retrieval preferences for data retrieval may be retrieved from the instance at block 902. The retrieval preferences may indicate the data to be retrieved as well as one or more sources from which to obtain the data. Of course, the data to be retrieved from a particular source (e.g., database) may be all data from that source or only selected portions of the data from a particular source. More particularly, the database adapter is configured and initialized for retrieving data from one or more databases. In addition, the database adapter may be configured to obtain data repeatedly in accordance with a specified scheduling frequency. At block 904, the data indicated by the retrieval preferences of the database adapter are obtained from the specified sources (e.g., databases) according to the scheduling frequency as defined in the retrieval preferences. In this manner, data may be retrieved from one or more databases.

Figures 10, 11:
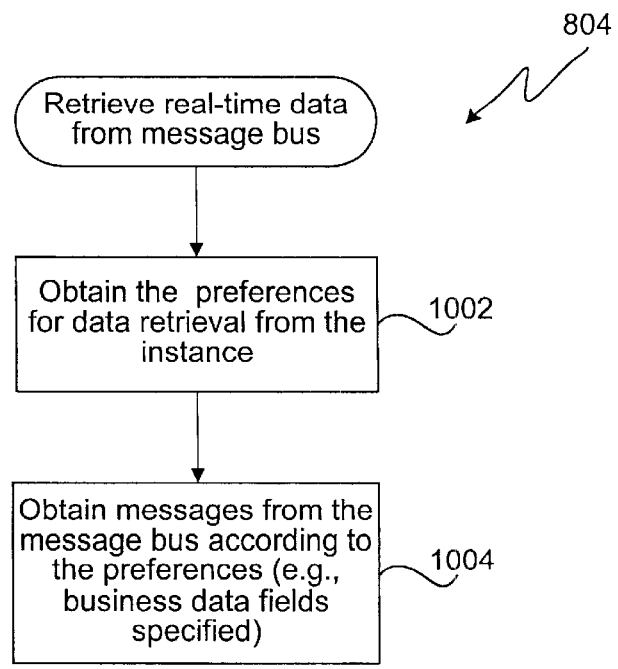
FIG. 10 is a process flow diagram illustrating one method of implementing a real-time adapter to retrieve data from one or more message buses as shown at block 804 of FIG. 8.
FIG. 11 is a diagram illustrating an exemplary data structure storing flagged data created at block 308 of FIG. 3, where the data structure identifies business attributes and business metrics such as those described with reference to FIG. 2.

A separate adapter is implemented for retrieving messages from the message bus. FIG. 10 is a process flow diagram illustrating one method of implementing a real-time adapter to retrieve data from one or more message buses as shown at block 804 of FIG. 8. First, the retrieval preferences for obtaining data may be retrieved from the instance at block 1002. The retrieval preferences may indicate the data to be retrieved as well as one or more sources from which to obtain the data. More particularly, the real-time messaging adapter is configured and initialized for retrieving data from one or more message buses having various message formats. At block 1004, the data indicated by the retrieval preferences of the real-time messaging adapter (e.g., corresponding to specified data fields) are obtained from the specified sources (e.g., message buses and message formats). Accordingly, the real-time messaging adapter retrieves data from the specified message buses.

As described above, in accordance with one embodiment of the invention, two different adapter objects are instantiated. However, it is contemplated that the database and real-time messaging adapters may be implemented separately without instantiating two different adapter objects. Moreover, the data retrieval functionality may be implemented as a single adapter rather than separately as two adapters. Thus, the above-described steps are merely illustrative and other methods of implementing the adapter are contemplated.

As described above with reference to block 308 of FIG. 3, at least a portion of the data obtained is flagged to identify one or more business events. FIG. 2 generally illustrates the use of one or more business attributes and/or one or more business metrics to identify a business event. FIG. 11 is a diagram illustrating an exemplary data structure that may be used to store data that is flagged or otherwise modified to identify business events. As shown, the data structure identifies business attributes 1102 and business metrics 1104 such as those described above with reference to FIG. 2. More particularly, each business attribute 1102 is identified (e.g., through the use of a number or index) as indicated by an attribute number 1106. Similarly, each business metric 1104 is identified through the use of a number or index). For instance, a business event (e.g., customer order) may be identified by the business attributes 1102 identifying the customer and order number. As shown, the business event (e.g., customer order) or associated business event (e.g., inventory level monitoring) may be further identified by the business metrics 1104 indicating inventory levels for each product ordered. Although the business attributes 1102 and business metrics 1104 are shown to be separate values here, the business attributes 1102 may also be business metrics 1104. In other words, those values tagged as business attributes 1102 may be used for subsequent value comparisons or monitoring. For instance, as shown, the customer field may be an attribute used to define the business event as well as be used for further event monitoring and/or value comparisons. Such a data structure is preferably implemented for each business event.

Although not illustrated in FIG. 11, the data structure may provide further information associated with the flagged data. For instance, a display sequence flag may be used to indicate a priority for each attribute and associated attribute value. In other words, the display sequence flag may be used by a business to indicate those attributes which are most important to it (or it's customers). More particularly, the display sequence flag may be used to prioritize information associated with multiple attributes that is provided in a notification message. This may be useful to select those attribute values to provide in a notification message where the display limits the amount of information that may be simultaneously displayed. For instance, this may be useful when a notification is sent to a pager having a limited display size.

Moreover, a timestamp flag may be used in various databases from which data is retrieved. The value of the timestamp flag may therefore be reflected in the data structure storing the flagged data. One use for a timestamp flag is to reflect the time that the data was stored or modified. In other words, when data is retrieved, the time stamp present in the database records may be used to ensure that the same data is not retrieved twice.

In addition, a primary key flag may be used to indicate one or more attributes from which values are to be used to form a key associated with the event. In this manner, a key may be generated that can be subsequently used to obtain data for the event. For example, the key may be a hash key stored in association with a hash value, described below. In this manner, a mechanism for creating a hash key may be provided in the flagged data.

Similarly, an interested field flag may be used to indicate one or more attributes from which values are to be obtained and stored in association with the event. For example, values associated with those attributes that have been flagged as interested fields may be used to generate a hash value for the event that may be accessed using the hash key, described above. In this manner, a single value for the event may be generated as a hash value for retrieval using a hash key.

Figure 12:
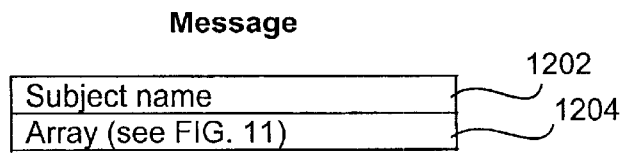
FIG. 12 is a block diagram illustrating an exemplary data structure that may be provided at block 310 of FIG. 3.

When the adapter provides the flagged data in a data structure such as that illustrated in FIG. 11, it preferably provides a message header and a message body. FIG. 12 is a block diagram illustrating an exemplary data structure that may be provided at block 310 of FIG. 3 for use in event monitoring. A header traditionally identifies a source and destination of the message. However, as shown, a subject may be provided as a message header 1202 to indicate one or more events for which data is provided in an associated message body 1204. The subject is preferably composed from the flagged data (e.g., the fields associated with the portion of the data that has been flagged). More particularly, the subject may be composed from business attributes and/or metrics that are flagged in the previously obtained data. For instance, the business attributes and/or metrics may be concatenated to form a single subject. The flagged data for one or more business events for that particular subject are then provided in the body 1204 of the message. The resulting message may then be sent via the message bus. An agent may then be able to select messages from the message bus according to the subject provided in the message header 1202.

As described above with reference to block 310 of FIG. 3, the flagged data identifying the business events is ultimately sent to the appropriate component(s) or transmitted on a message bus for retrieval by the appropriate component(s). However, there may be instances when data associated with an event may have already been sent. In this case, it may be preferable to send the data associated with the event only when the values have changed from the values previously received and/or transmitted for that event. Thus, it is useful to identify value changes associated with a particular event. In order to identify value changes of data associated with a particular event, it may be useful to store at least a portion of the data for that event to enable subsequent value comparisons. The data that is stored preferably includes the values for the flagged data fields. For instance, the data that is stored may include values associated with business attributes and/or values associated with business metrics for that event.

Figure 13:
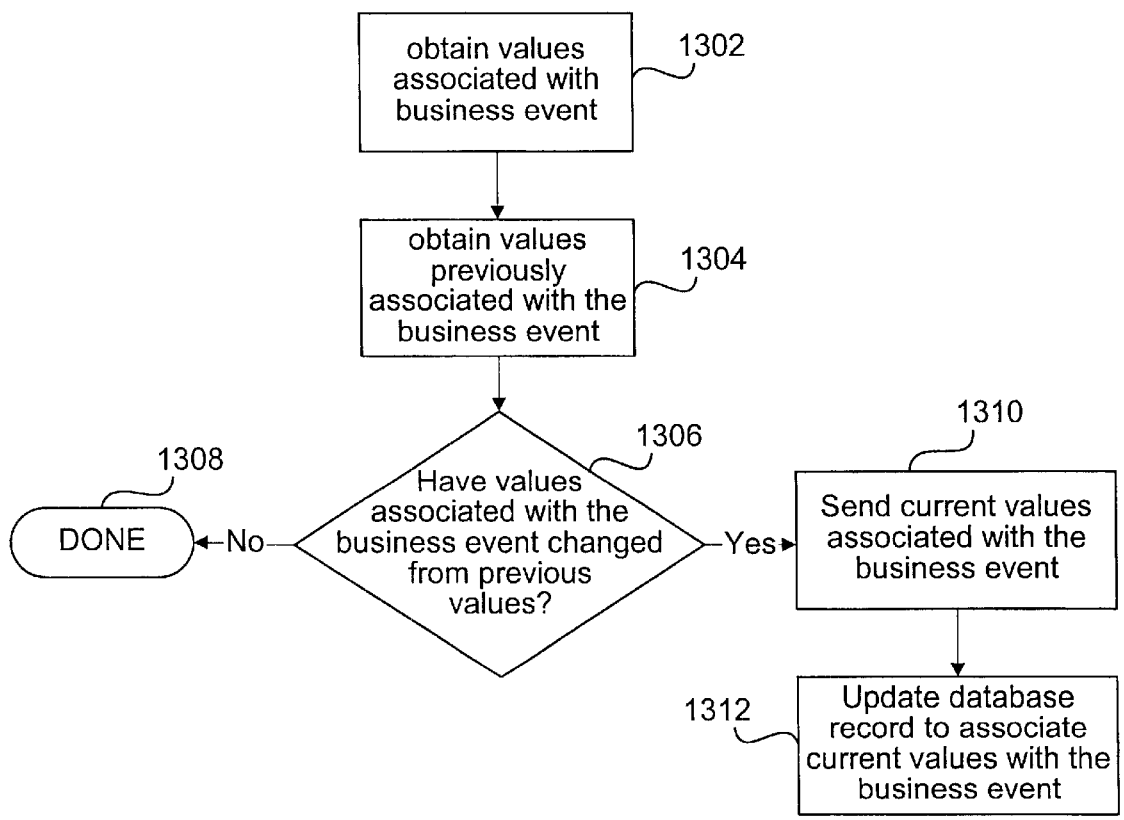
FIG. 13 is a process flow diagram illustrating one method of identifying values obtained at block 304 of FIG. 3 for a particular business event that have changed from values previously associated with the business event prior to sending flagged business data at block 310 of FIG. 3.

FIG. 13 is a process flow diagram illustrating one method of identifying values obtained at block 304 of FIG. 3 for a particular business event that have changed from values previously associated with the business event prior to sending the flagged data at block 310 of FIG. 3. As shown at block 1302, information indicating a first set of one or more values associated with a business event are obtained or received. In addition, information indicating a second set of one or more values previously associated with the business event are obtained (e.g., from a stored record) at block 1304. The information is then compared to enable the two sets of values to be compared. If it is determined that the values associated with the business event have not changed from values previously associated with that business event at block 1306, the process ends at block 1308. In other words, the values have not changed and therefore would not need to be re-transmitted. Thus, the values for that event may be removed from the flagged data prior to providing the flagged data (e.g., transmitting the flagged data). Moreover, the record storing data or otherwise identifying or indicating one or more values for that event need not be updated. However, if it is determined that one or more of the values associated with the event have changed, the current values associated with the business event are sent at block 1310 and the database record is updated accordingly at block 1312 to associate the current values with the business event. The values associated with the event and compared for value changes may include values associated with the flagged portion of the data, but may further include other values that have not been flagged. For instance, the values for a single event may include values associated with business attributes defining the event as well as values associated with business metrics identifying values that are significant to the business event, or values that are to be subsequently monitored. As described above, each of the values may have been obtained from a message bus or database.

One exemplary way to identify value changes associated with a business event is through the use of a hash table that maintains data for business events. A hash table is commonly used to provide fast access to objects either by name (e.g., string) or numerical key. A hash table is generally treated as an array with an index. Thus, the performance of the hash table used often depends on the algorithm used to convert a key into an index.

Figure 14:
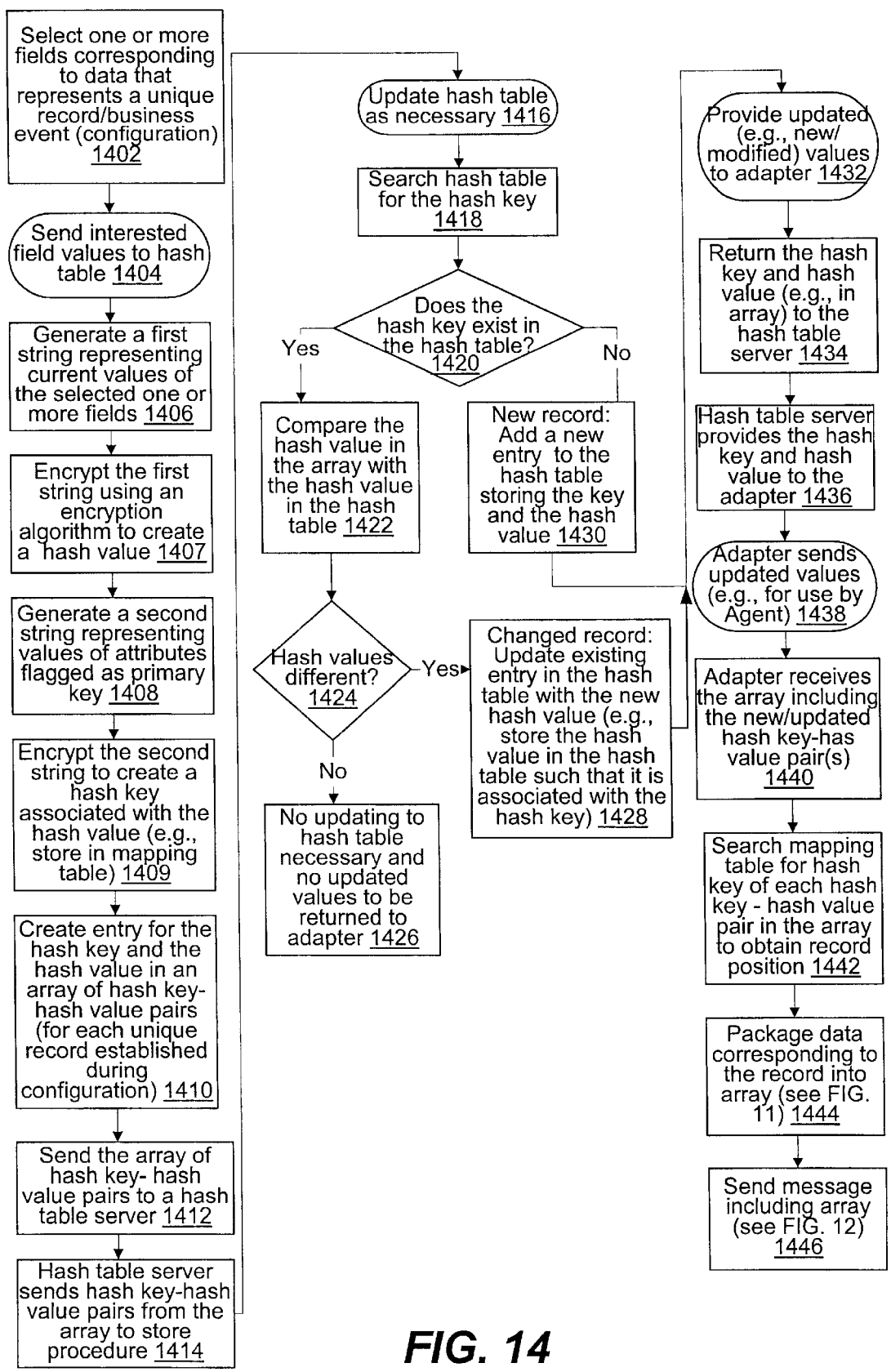
FIG. 14 is a process flow diagram illustrating a specific method of identifying modified values as shown in FIG. 13.

FIG. 14 is a process flow diagram illustrating a specific method of identifying modified values associated with a business event as shown in FIG. 13 through the use of a hash table. As described above with reference to block 302 of FIG. 3 and FIG. 4 through FIG. 6, when the adapter is configured, the data is flagged such that a business event is identified as shown at block 1402. For instance, one or more fields corresponding to a business event may be selected during configuration and subsequently flagged such that a unique record is represented. As shown at block 1404, the values associated with these fields are then sent to a hash table to enable information indicating these values to be stored, as will be described as follows with reference to blocks 1406–1414. More particularly, a first string representing current values of one or more of the selected fields is generated at block 1406. For example, a string may be generated from values for selected interested fields of those fields that represent a unique event, as described above with reference to FIG. 11. More particularly, interested fields may be a subset of all fields (e.g., attributes) that define an event. The first string is then encrypted using an encryption algorithm to create a hash value at block 1407. A hash key is then generated. More particularly, a second string representing values of attributes previously flagged as "primary key" as described above with reference to FIG. 11 may be generated at block 1408. The second string is then encrypted to create a hash key associated with the hash value at block 1409. In this manner, various attribute values (e.g., primary key values) may be used to create a hash key. The hash key may then be stored in a mapping table. An exemplary hash table and an exemplary mapping table will be described in further detail below with reference to FIG. 15 and FIG. 16, respectively. An entry is then created in an array of hash key-hash value pairs and the hash key and the hash value are stored in this entry at block 1410. The array of hash key-hash value pairs is then sent to a hash table server at block 1412. The hash table server then sends each hash key-hash value pair from the array to a store procedure at block 1414. In this manner, information indicating the value combination for each business event is sent to the hash table.

As shown at block 1416, the hash table is then updated as necessary to reflect the most recent information it has received for each business event. The updating process is described with reference to blocks 1418–1430. For instance, the hash table is searched at block 1418 for the first hash key. If at block 1420 it is determined that the hash key exists in the hash table, the hash value for that entry in the hash table is compared to the value received from the array at block 1422. If it is determined at block 1424 that the hash values are not different, the hash table need not be updated and there are no updated values to be returned to the adapter, as shown at block 1426. However, if it is determined at block 1424 that the hash values are different, the existing entry in the hash table is updated at block 1428 with the new hash value. In other words, the hash value is stored in the hash table such that it is associated with the hash key. If it is determined at block 1420 that the hash key does not exist in the hash table, a new record is created by adding a new entry to the hash table storing the key and the hash value at block 1430.

In addition to updating the hash table that tracks the most recent value combinations for any given business event, the updated values (e.g., new event or modified values) are also provided to the adapter for transmission to the appropriate entity. Moreover, even when the event is not a new event for which data is being transmitted and the values associated with the event have not been modified, it may be desirable to send the flagged data for that event. In other words, it may be preferable to re-transmit identical data for a particular event rather than filtering that data.

As shown at block 1432, the updated values for the event (e.g., new or modified values) are provided to the adapter for transmission. Thus, as shown at block 1434, the hash key and the hash value (e.g., from the array storing the hash key-hash value pairs) are returned to a hash table server. For example, an array of hash key-hash value pairs may be returned to the hash table server. The hash table server then provides the hash key and the hash value (e.g., array of hash key-hash value pairs) to the adapter 1436 for subsequent transmission.

Once the adapter receives the updated values, the adapter sends the updated values as shown at block 1438 (e.g., for use by an agent). For instance, the adapter may receive an array including new and/or updated hash key-hash value pair(s) at block 1440. A mapping table such as that illustrated in FIG. 16 may then be searched at block 1442 for a hash key for each hash key-hash value pair in the array to obtain a pointer or record position for that data record. The flagged data in that data record is then packaged for transmission at block 1444. For instance, the flagged data may be packaged into an array such as that illustrated in FIG. 11. A message including the array such as that shown in FIG. 12 is then sent at block 1446.

Figures 15, 16, 17:
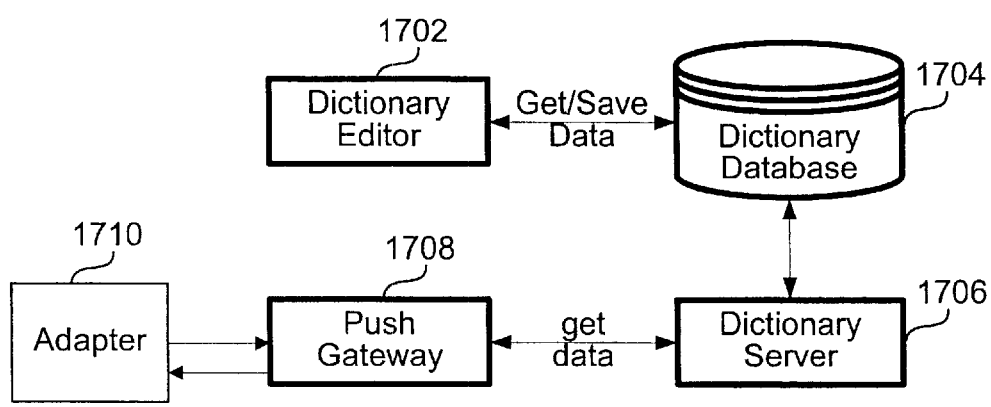
FIG. 15 is a diagram illustrating an exemplary hash array that is packaged and sent to a hash table server as shown at blocks 1434 of FIG. 14.
FIG. 16 is a diagram illustrating an exemplary mapping table that is searched at block 1442 of FIG. 14 to identify a record associated with a hash key.
FIG. 17 is a diagram illustrating an exemplary configuration that may be used to define preferences for data retrieval, flagging, and transmission such as those described with reference to FIG. 4 through FIG. 6.

FIG. 15 is a diagram illustrating an exemplary hash array that is packaged and sent to a hash table server as shown at block 1434 of FIG. 14. As shown, a hash key 1502 and hash value 1504 of each hash key-hash value pair is provided in the array. In this manner, the appropriate hash key-hash value pairs may be provided to the adapter.

Once the value changes for a previous event or values for a new event have been detected, the actual values rather than the "composite" values (e.g., strings) will be transmitted by the adapter. Thus, the data record for the event is preferably obtained to retrieve these values. FIG. 16 is a diagram illustrating an exemplary mapping table that is searched at block 1442 of FIG. 14 to identify a record associated with a hash key. More particularly, as shown, a hash key 1602 is associated with a record position 1604 or pointer associated with a particular data record. In this manner, the actual data record associated with the hash key may easily be obtained.

FIG. 17 is a diagram illustrating an exemplary configuration that may be used to define preferences for data retrieval, flagging, and transmission such as those described above with reference to FIG. 4 through FIG. 6. More particularly, preferences ultimately stored in a database as shown at block 114 of FIG. 1 may be established through a dictionary editor 1702 that enables retrieval and sending preferences to be established via a graphical user interface. More particularly, the dictionary editor 1702 enables retrieval and sending preferences to be defined and stored in a dictionary database 1704. For instance, the dictionary editor 1702 enables a business to define various events, business attributes and business metrics that are suitable for its particular business and/or industry. A dictionary server 1706 enables preferences stored in the dictionary database to be obtained by the adapter via a push gateway 1708. More particularly, as described above with reference to block 704 of FIG. 7, preferences established during adapter configuration for an adapter instance 1710 are obtained and provided to the adapter instance 1710. This may be accomplished by sending information identifying the adapter instance 1710 to the push gateway 1708. The push gateway 1708 then obtains the preferences established during adapter configuration from the dictionary database 1704 via the dictionary server 1706. The push gateway 1708 then sends the preferences to the adapter instance 1710.

Various algorithms may be used to adjust memory usage when retrieving data from one or more source databases such as at block 306 of FIG. 3 described above. For instance, a maximum number of records to be retrieved may be established by a business using the adapter. In addition, a delay may be inserted between the processing and publishing of each message by the adapter. In this manner, memory usage may be minimized while preventing the loss of messages due to fast publication rate.

The present invention captures and generates valuable business data through a variety of processes. As described above, data is captured and flagged to identify various "business events" or metrics to enable these events or metrics to be tracked and monitored. Thus, the flagged data may be used to capture and identify the most valuable data that is pertinent to the internal operation of a business. This data may then be used to enable important management decisions to be made within a business using the data available to it. Moreover, through the use of the flagged data, business operations may be effectively monitored, thereby enabling businesses to use this information to their economic advantage. Accordingly, the present invention may be used as a valuable tool by a business to evaluate the effectiveness of its employees as well as its operations.

Figure 18:
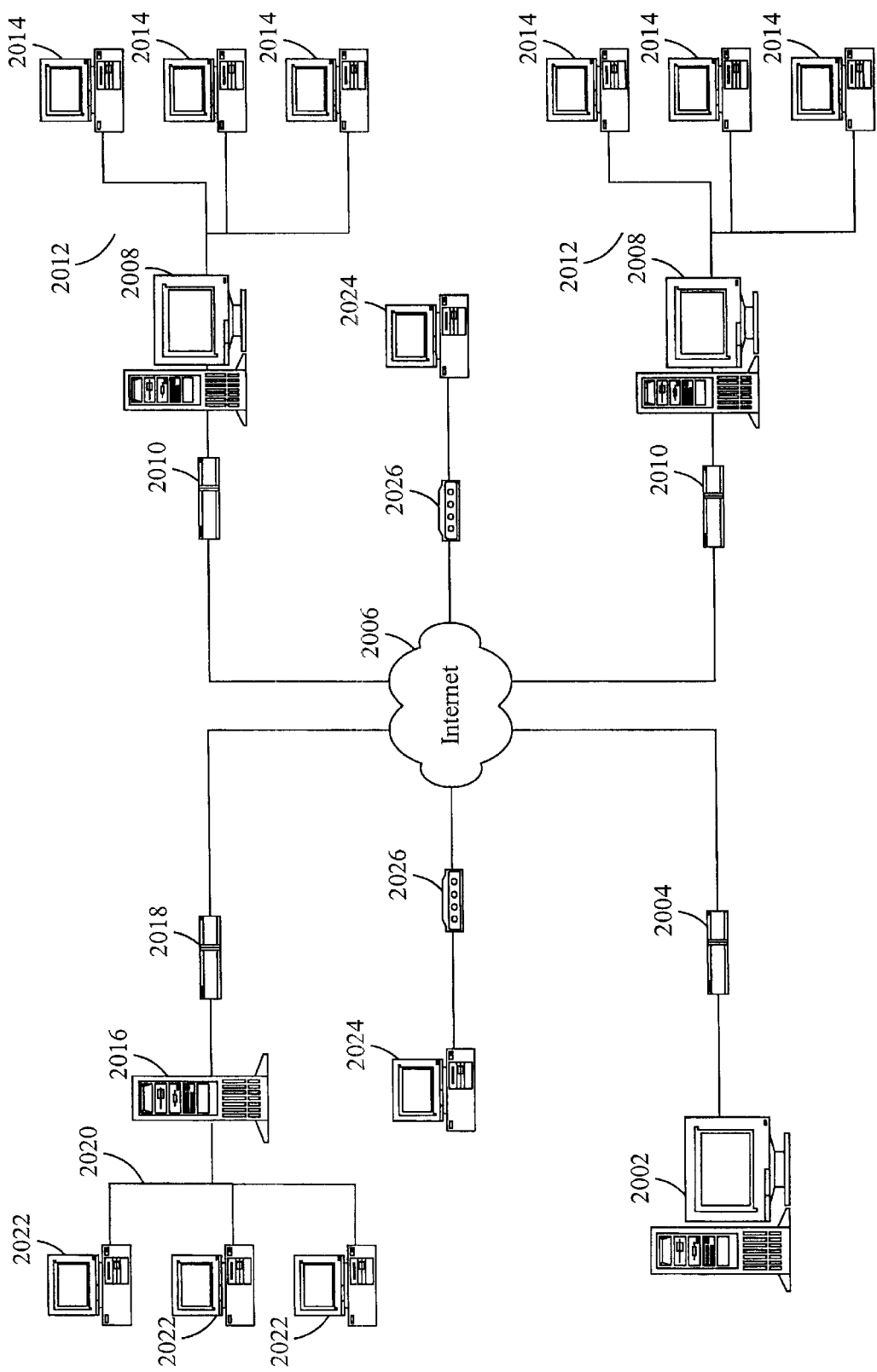
FIG. 18 is a block diagram of a hardware environment in which the various embodiments of the present invention may be implemented.

The invention may be installed for use at a server for use by a specific business. However, the invention may also be installed for use across a network such as the Internet, thereby enabling communication among multiple entities as well as data retrieval from disparate sources. FIG. 18 is a block diagram of a hardware environment in which the various embodiments of the present invention may be implemented. The web site at which communications within a business, and potentially between businesses and customers (e.g., consumers or other businesses), are facilitated according to the invention is located on a server 2002, which is connected by a router 2004 to the Internet 2006. For instance, the server 2002 may be located at a business wishing to track various events within its business. Other businesses (represented by servers 2008) may also be connected to the Internet via routers 2010 in order to receive the transmission of data (e.g., flagged data), events, metrics, exceptions, and/or notifications from the server 2002. The invention may also be installed for internal use by these other businesses 2008 to enable them to generate their own data (e.g., flagged data), events, exceptions, and/or notifications for internal use as described above or for transmission via the Internet 2006. Business servers 2008 may have networks 2012 associated therewith interconnecting a plurality of personal computers or work stations 2014. Customers of the business (represented by computers 2022 and 2024) may be connected to the Internet in a variety of ways. For example, a consumer may be connected from his home via a modem 2026, or from his workplace via a network 2020, a file server 2016, and a router 2018. It will be understood that, according to various embodiments of the invention, consumers may gain access to the web site on server 2002 via a variety of hardware configurations. Similarly, businesses may be coupled to the web site on server 2002 in order to receive the transmission of communications as well as data from the web site. For example, a business may consist of an individual on his home computer 2024. Similarly, a consumer may be an employee who accesses the web site from his computer 2014 at his place of employment which is a business. For instance, the business may be a supplier, manufacturer or reseller. It will also be understood that the hardware environment of FIG. 18 is shown for illustrative purposes and that a wide variety of hardware environments may be employed to implement the various embodiments of the present invention. It should also be understood that specific embodiments of the methods and processes described herein are implemented as computer program instructions, i.e., software, in the memory of server 2002.

Various embodiments of the invention can also be embodied as computer readable code on a computer readable medium. The computer readable medium is any data storage device that can store data which can thereafter be read by a computer system. Examples of the computer readable medium include read-only memory, random-access memory, CD-ROMs, magnetic tape, and optical data storage devices.

Although illustrative embodiments and applications of this invention are shown and described herein, many variations and modifications are possible which remain within the concept, scope, and spirit of the invention, and these variations would become clear to those of ordinary skill in the art after perusal of this application. For instance, although the present invention is described within the context of a business, the use of the term event (and associated attributes and metrics) may be applicable to any data retrieval, monitoring or notification context. Moreover, the present invention is based upon the generation and transmission of flagged data, preferably transmitting the flagged data, events, exceptions, and notifications for internal use by a business. However, it should be understood that the present invention is not limited to this arrangement, but instead would equally apply regardless of the mode of transmission. Thus, data may be retrieved from sources (e.g., databases) that are maintained internal to the business as well as from sources that are external to the business (e.g., via the Internet). This data may be in any format, and therefore may be obtained from a database, message bus, or other suitable data source. Thus, the data may be a packet (e.g., email message) or other data structure that has been stored, obtained or otherwise provided to the system for subsequent event interpretation and monitoring. Moreover, the transmission of flagged data, events, exceptions, and notifications are described above with reference to the use of the invention by a particular business. However, flagged data, events, exceptions, and notifications may be transmitted across a network such as the Internet for use within the same business as well as across different entities (e.g., among businesses and between businesses and customers of those businesses). In other words, functions performed by modules such as the adapter, agent, exception server, and notification server may be implemented together at a single server or business, as well as separately at different locations via a network such as the Internet. Thus, the terms adapter, agent, exception server, and notification are merely illustrative and are not meant to require that the functions be performed by specific or separate modules or servers. Accordingly, the present embodiments are to be considered as illustrative and not restrictive, and the invention is not to be limited to the details given herein, but may be modified within the scope and equivalents of the appended claims.

What is claimed is:

1. A method of identifying data that is to be monitored by a business, comprising:

obtaining data including one or more fields and associated values;

flagging the data such that an event is associated with the data, the event indicating one or more of the fields that are pertinent to the event, thereby identifying one or more of the values to be monitored in association with the event;

transmitting the flagged data;

wherein the business has one or more entities associated therewith, and wherein obtaining data including one or more fields and associated values comprises:

obtaining data from a first one of the entities associated with the business; and wherein transmitting the flagged data comprises sending the flagged data identifying the event such that the flagged data is accessible to a second one of the entities associated with the business.

2. A method of identifying data that is to be monitored by a business, comprising:

obtaining data including one or more fields and associated values;

flagging the data such that a business context is associated with the data, the business context indicating one or more of the fields that are pertinent to the business; and wherein the flagged data identifies one or more of the values of the data to be monitored by the business when the flagged data is transmitted;

wherein the business has one or more entities associated therewith, and wherein obtaining data including one or more fields and associated values comprises:

obtaining data from a first one of the entities associated with the business; and wherein transmitting the flagged data comprises sending the flagged data such that the flagged data is accessible to a second one of the entities associated with the business.

3. The method as recited in claim 1, wherein the business context and the identification of the values to be monitored are indicated through flagging at least a portion of the obtained data.

4. A method of identifying one or more business events of interest to a business to enable the business events to be monitored, the method comprising:

obtaining data including one or more values;

flagging at least a portion of the data to identify one or more business attributes that together define a business event of interest to the business such that the business event is defined within the data;

flagging at least a portion of the data to identify one or more business metrics that identify one or more values that are to be monitored in association with the business event such that the values to be monitored in association with the business event are identified within the data, wherein the business has one or more entities associated therewith; and sending the flagged data defining the business event and identifying one or more business metrics that identify one or more values that are to be monitored in association with the business event such that the flagged data is accessible to a second one of the entities associated with the business;

wherein obtaining data including one or more values includes obtaining data from a first one of the entities associated with the business.

5. A computer-readable medium storing thereon computer-readable instructions for modifying data for use by a business, comprising:

instructions for obtaining data including one or more values;

instructions for flagging at least a portion of the data to identify one or more business events of interest to the business;

instructions for transmitting the flagged data for one or more of the identified business events of interest to the business, thereby enabling the identified business events to be monitored;

wherein the business has one or more entities associated therewith;

wherein the instructions for obtaining data including one or more values comprises instructions for obtaining data from a first one of the entities associated with the business; and wherein the instructions for transmitting the flagged data identifying the business events comprises instructions for sending the flagged data identifying the business events such that the flagged data is accessible to a second one of the entities associated with the business.

6. The computer-readable medium as recited in claim 5, wherein the computer readable medium is selected from the group consisting of CD-ROM; floppy disk, tape, flash memory, system memory, hard drive, and data signal embodied in a carrier wave.

7. An apparatus for modifying data for use by a business, comprising:

a processor; and a memory, at least one of the processor and the memory being adapted for performing the following steps:

obtaining data including one or more values;

flagging at least a portion of the data to identity one or more business events of interest to the business;

transmitting the flagged data for one or more of the identified business events of interest to the business, thereby enabling the identified business events to be monitored;

wherein the business has one or more entities associated therewith;

wherein obtaining data including one or more values comprises obtaining data from a first one of the entities associated with the business; and wherein transmitting the flagged data identifying the business events comprises sending the flagged data identifying the business events such that the flagged data is accessible to a second one of the entities associated with the business.

8. An apparatus for modifying data for use by a business, comprising:

means for obtaining data including one or more values;

means for flagging at least a portion of the data to identify one or more business events of interest to the business;

means for transmitting the flagged data for one or more of the identified business events of interest to the business, thereby enabling the identified business events to be monitored;

wherein the business has one or more entities associated therewith;

wherein obtaining data including one or more values comprises obtaining data from a first one of the entities associated with the business; and wherein transmitting the flagged data identifying the business events comprises sending the flagged data identifying the business events such that the flagged data is accessible to a second one of the entities associated with the business.

9. A method of modifying data for use by a business, comprising:

obtaining data including one or more values;

flagging at least a portion of the data to identify one or more business events of interest to the business; and transmitting the flagged data for one or more of the identified business events of interest to the business, thereby enabling the identified business events to be monitored, wherein the business has one or more entities associated therewith, and wherein obtaining data including one or more values comprises:

obtaining data from a first one of the entities associated with the business; and wherein transmitting the flagged data identifying the business events comprises sending the flagged data identifying the business events such that the flagged data is accessible to a second one of the entities associated with the business.

10. The method as recited in claim 9, wherein flagging at least a portion of the data comprises:

associating one or more event descriptors with the flagged data.

11. The method as recited in claim 9, wherein each of the business events is identified by at least one of content of the data, importance of the data, and purpose of at least a portion of the data.

12. The method as recited in claim 11, wherein the purpose of at least a portion of the data is for monitoring of the associated business event.

13. The method as recited in claim 12, wherein the purpose of at least a portion of the data is indicated by one or more business metrics of interest to the business for which one or more values are to be monitored.

14. The method as recited in claim 11, wherein the content of the data is identified by one or more business attributes.

15. The method as recited in claim 11, wherein the importance of the data is signified by flagging at least a portion of the data.

16. The method as recited in claim 11, wherein the importance of the data is signified by one or more indices.

17. The method as recited in claim 16, wherein the one or more indices enable the data to be ranked according to importance.

18. The method as recited in claim 9, wherein the business includes one or more entities and wherein flagging at least a portion of the data comprises:

for each identified business event, labeling one or more values as a value of interest to one or more of the entities of the business.

19. The method as recited in claim 9, wherein the business includes one or more entities, and wherein the one or more business values have one or more fields associated therewith, and wherein flagging at least a portion of the data comprises:

for each identified business event, labeling one or more fields as fields of interest to one or more of the entities of the business.

20. The method as recited in claim 9, wherein the business has one or more entities associated therewith, and wherein obtaining data including one or more values comprises:

receiving the data from one or more of the entities associated with the business.

21. The method as recited in claim 9, wherein the business has one or more entities associated therewith, and wherein obtaining data including one or more values comprises:

receiving the data from a source outside the business.

22. The method as recited in claim 9, further comprising:

receiving a set of business events to be monitored, each of the business events being defined by one or more event attributes; and configuring the monitoring and detection system to flag the data that is obtained to identify the business events to be monitored, thereby enabling the flagged data to be monitored for one or more of the set of events when the flagged data is transmitted.

23. The method as recited in claim 9, wherein the second entity associated with the business is adapted for detecting one or more states of the flagged data.

24. The method as recited in claim 9, wherein the second entity associated with the business is adapted for monitoring the flagged data and generating a business exception for each of the identified business events that are detected.

25. The method as recited in claim 9, wherein the first entity and the second entity are provided in a single entity.

26. The method as recited in claim 9, wherein flagging at least a portion of the data comprises:

identifying one or more business attributes such that together the one or more business attributes identify a business event of interest to the business.

27. The method as recited in claim 9, wherein flagging at least a portion of the data comprises:

identifying one or more business metrics of interest to the business for which one or more values are to be monitored.

28. The method as recited in claim 9, wherein flagging at least a portion of the data comprises:

identifying one or more business metrics of interest to the business for which one or more values are to be compared with another set of values.

29. The method as recited in claim 9, wherein obtaining data including one or more values comprises obtaining data from at least one of a message bus and one or more data sources.

30. The method as recited in claim 9, further comprising:
configuring preferences for use in the obtaining and flagging steps for a particular business or industry.

31. The method as recited in claim 9, further comprising:
obtaining retrieval preferences, the retrieval preferences indicating one or more preferences for obtaining the data.

32. The method as recited in claim 31, wherein the retrieval preferences indicate at least one of business preferences of the business providing the flagged data, customer preferences of a customer of the business, and customer preferences of a business that is to receive products, services, or information from the business.

33. The method as recited in claim 31, wherein the retrieval preferences indicate at least one of business preferences of the business providing the flagged data and customer preferences of a business that is to receive at least a portion of the flagged data.

34. The method as recited in claim 31, wherein the retrieval preferences indicate at least one of one or more data fields indicating data to be retrieved, one or more sources of data retrieval, a type of the one ormore sources of data retrieval, and scheduling frequency for data retrieval.

35. The method as recited in claim 34, wherein obtaining the data comprises:
retrieving the data associated with the one or more data fields in accordance with a maximum amount of data.

36. The method as recited in claim 35, wherein the sources include a database and the maximum amount of data is a maximum number of records that may be retrieved from the database.

37. The method as recited in claim 34, wherein the retrieval preferences further comprise data retrieval filtering criteria indicating the data to be retrieved for one or more of the indicated data fields.

38. The method as recited in claim 37, wherein the data retrieval filtering criteria includes one or more data retrieval operators.

39. The method as recited in claim 34, wherein the retrieval preferences further comprise a scheduling frequency operator indicating the scheduling frequency for data retrieval.

40. The method as recited in claim 34, wherein the type of the sources of data retrieval is at least one of a database type and an application type.

41. The method as recited in claim 34, wherein the scheduling frequency for data retrieval is associated with one of the sources of data retrieval.

42. The method as recited in claim 34, wherein obtaining data including one or more values comprises:
retrieving the data associated with the indicated data fields.

43. The method as recited in claim 42, wherein retrieving the data associated with the indicated data fields comprises:
retrieving the data associated with the indicated fields from the one or more sources of data retrieval.

44. The method as recited in claim 42, wherein obtaining data including one or more values further comprises:
repeating the step of retrieving the data associated with the indicated data fields at a frequency specified by the scheduling frequency.

45. The method as recited in claim 34, wherein the one or more sources of retrieval indicates at least one of a message bus and one or more databases.

46. The method as recited in claim 45, wherein when the sources of retrieval indicates a message bus, obtaining data including one or more values comprises:
listening to the message bus.

47. The method as recited in claim 31, wherein obtaining data including one or more values comprises obtaining data in accordance with the retrieval preferences.

48. The method as recited in claim 9, further comprising:
inserting a delay between obtaining the data and providing the flagged data.

49. The method as recited in claim 9, further comprising:
inserting a delay between flagging at least a portion of the data and providing the flagged data.

50. The method as recited in claim 49, wherein transmitting the flagged data comprises:
publishing the flagged data on a message bus.

51. The method as recited in claim 9, further comprising:
obtaining sending preferences for transmitting the flagged data, the sending preferences indicating one or more preferences for flagging the data to identify one or more business events of interest to the business.

52. The method as recited in claim 51, wherein the sending preferences indicate at least one of business preferences of the business providing the flagged data, customer preferences of a customer of the business, and customer preferences of a business that is to receive products, services, or information from the business.

53. The method as recited in claim 51, wherein the sending preferences indicate at least one of business preferences of the business providing the flagged data and customer preferences of a business that is to receive at least a portion of the flagged data.

54. The method as recited in claim 51, wherein the sending preferences indicate one or more business attributes to be flagged, the one or more business attributes together defining a business event of interest to the business, and wherein flagging at least a portion of the data comprises:
flagging the business attributes in the obtained data.

55. The method as recited in claim 51, wherein the sending preferences indicate one or more business metrics to be flagged, the one or more business metrics indicating one or more numerical values to be monitored, and wherein flagging at least a portion of the data comprises:
flagging the business metrics in the obtained data.

56. The method as recited in claim 51, wherein the sending preferences indicate one or more business metrics to be flagged, the one or more business metrics indicating one or more numerical values to be used in one or more subsequent value comparisons, and wherein flagging at least a portion of the data comprises:
flagging the business metrics in the obtained data.

57. The method as recited in claim 9, further comprising:
instantiating an adapter object, the adapter object including methods for performing the steps of obtaining data, flagging at least a portion of the data, and providing the flagged data;
obtaining retrieval preferences indicating the data to be obtained by the adapter object; and
obtaining sending preferences indicating one or more business events of interest to the business, the sending preferences indicating data to be flagged and transmitted by the adapter abject; and initializing the adapter object with the retrieval preferences and the sending preferences.

58. The method as recited in claim 57, wherein obtaining data comprises obtaining data indicated by the retrieval preferences and wherein flagging at least a portion of the data comprises flagging at least a portion of the data as specified by the sending preferences.

59. The method as recited in claim 57, wherein the retrieval preferences indicate one or more sources from which to obtain the data and wherein obtaining data comprises obtaining the data indicated by the retrieval preferences from the sources.

60. The method as recited in claim 59, wherein the retrieval preferences further indicate a scheduling frequency indicating a frequency that data is to be obtained, and wherein obtaining data is performed repeatedly in accordance with the scheduling frequency.

61. The method as recited in claim 59, wherein the sources include at least one of one or more databases and a message bus.

62. The method as recited in claim 9, wherein providing the flagged data comprises:

composing a message having a header and a body, the header including a subject indicating one or more events for which data is provided in the body of the message; and sending the message on a message bus.

63. The method as recited in claim 62, wherein the subject is composed from one or more business attributes defining the one or more business events.

64. The method as recited in claim 62, wherein the subject is composed from at least one of one or more business attributes defining the one or more business events and one or more business metrics indicating one or more values to be monitored.

65. The method as recited in claim 62, wherein the subject is composed from the flagged data.

66. The method as recited in claim 62, wherein the subject is composed from fields associated with the portion of the data that has been flagged.

67. The method as recited in claim 22, further comprising:

determining whether one or more of the values associated with one of the identified business events have changed from values previously associated with the business event;

when it is determined that one or more of the values associated with the business event have changed, transmitting the flagged data for one or more of the identified business events comprises providing flagged data associated with the business event; and when it is determined that one ormore of the values associated with the one of the identified business events have not changed, the flagged data that is transmitted does not include flagged data associated with the business event.

68. The method as recited in claim 67, wherein when it is determined that the values associated with the one of the identified business events have not changed, removing the flagged data associated with the business event from the flagged data for the one or more business events prior to transmitting the flagged data for one or more of the identified business events of interest to the business.

69. The method as recited in claim 67, wherein when it is determined that one or more of the values associated with the business event have changed, updating a database record to associate a new set of values with the business event.

70. The method as recited in claim 67, wherein the values associated with the one of the identified business events comprise at least one of one or more values associated with a business attribute defining the event and one or more values associated with a business metric identifying one or more values that are important to the business event.

71. The method as recited in claim 67, wherein the values associated with the one of the identified business events comprise at least one of one or more values associated with a business attribute defining the event and one or more values associated with a business metric identifying one or more values that are values to be subsequently monitored.

72. The method as recited in claim 67, wherein determining whether one or more of the values associated with one of the identified business events have changed from values previously associated with the business event comprises:

obtaining information indicating a first set of values associated with the business event; and comparing information indicating a second set of values associated with the business event with the obtained information.

73. The method as recited in claim 72, wherein the first set of values and the second set of values comprise values that have been flagged.

74. The method as recited in claim 72, wherein the first set of values and the second set of values comprise values that have been obtained from at least one of a message bus and one or more databases.

75. The method as recited in claim 9, further comprising:

determining whether flagged data for one of the identified business events has been provided;

wherein the step of transmitting the flagged data for one or more of the identified business events comprises sending flagged data for the business event when it is determined that the flagged data for the business event has not been provided.

76. The method as recited in claim 9, further comprising:

determining whether one or more of the values associated with one of the identified business events have previously been obtained;

when it is determined that one ormore of the values associated with the business event have not previously been obtained, transmitting the flagged data for one or more of the identified business events comprises providing flagged data associated with the business event; and when it is determined that one or more of the values associated with the one of the identified business events have previously been obtained, the previously obtained values are compared with a new set of one or more values associated with the business event, the new set of one or more values being values in the flagged data;

when the new set of one or more values is determined to be different from the previously obtained values, the flagged data that is transmitted includes flagged data associated with the business event; and when the new set of one or more values is not determined to be different from the previously obtained values, the flagged data that is transmitted does not include flagged data associated with the business event.

77. The method as recited in claim 72, wherein obtaining information indicating a first set of values associated with the business event comprises:

obtaining the information indicating the first set of values from a hash table.

78. The method as recited in claim 77, wherein when it is determined that one or more of the values associated with the business event have changed, updating an entry for the business event in the hash table.

79. The method as recited in claim 9, further comprising:
receiving a set of retrieval preferences, the retrieval preferences indicating data to be obtained from one or more sources, the data including one or more values; and
receiving a set of sending preferences, the sending preferences indicating a mechanism for flagging at least a portion of the obtained data to identify one or more business events, thereby enabling the identified events to be monitored within the flagged data when the flagged data is transmitted.

80. The method as recited in claim 79, further comprising:
storing the set of retrieval preferences and the set of sending preferences for use by an adapter configured to retrieve data in accordance with the set of retrieval preferences and to modify the retrieved data in accordance with the set of sending preferences.

81. The method as recited in claim 79, wherein the retrieval preferences indicate at least one of data fields indicating the data to be retrieved, the one or more sources of data retrieval, and scheduling frequency for data retrieval.

82. The method as recited in claim 79, wherein the sending preferences indicate one or more attributes to be flagged, the one or more attributes together defining an event.

83. The method as recited in claim 82, wherein the event is selectable to identify a business event of interest to a business.

84. The method as recited in claim 79, wherein the sending preferences indicate one or more metrics to be flagged, the one or more metrics indicating one or more numerical values to be monitored.

85. The method as recited in claim 79, wherein the sending preferences indicate one or more metrics to be flagged, the one or more business metrics indicating one or more numerical values to be used in one or more subsequent value comparisons.

86. A method of modifying data for use by a business, comprising:
obtaining data including one or more values;
flagging at least a portion of the data to identify a business event of interest to the business;
determining whether the flagged data for the business event has been transmitted; and
transmitting the flagged data for the business event when it is determined that the flagged data for the business event has not been transmitted;
wherein the business has one or more entities associated therewith;
wherein obtaining data including one or more values comprises obtaining data from a first one of the entities associated with the business; and
wherein transmitting the flagged data identifying the business event comprises sending the flagged data identifying the business event such that the flagged data is accessible to a second one of the entities associated with the business.

87. A method of modifying data for use by a business, comprising:
obtaining data including one or more values;
flagging at least a portion of the data to identify a business event of interest to the business;
determining whether one or more values associated with the flagged data for the business event have changed from previously obtained data;
transmitting the flagged data for the business event when it is determined that one or more values associated with the flagged data for the business event have changed;
wherein the business has one or more entities associated therewith;
wherein obtaining data including one or more values comprises obtaining data from a first one of the entities associated with the business; and
wherein transmitting the flagged data identifying the business event comprises sending the flagged data identifying the business event such that the flagged data is accessible to a second one of the entities associated with the business.

88. The method as recited in claim 87, wherein flagging at least a portion of the data comprises flagging one or more business attributes, and wherein determining whether one or more values associated with the flagged data for the business event have changed from previously obtained data comprises converting the values associated with one or more of the flagged business attributes to a generic format.

89. The method as recited in claim 88, wherein the generic format is compatible with any number of flagged business attributes and with any number of values associated with the flagged data.

90. The method as recited in claim 89, wherein at least one of the number of flagged business attributes and the number of values associated with the flagged data that are converted are unspecified.

91. The method as recited in claim 88, wherein the number of values associated with the flagged data for the business event that have changed from previously obtained data is unknown.

92. The method as recited in claim 88, wherein the number of values associated with the flagged data for the business event that have changed from previously obtained data is less than or equal to the number of values associated with the flagged data that are converted.

* * * * *